United States Patent
Tom et al.

(10) Patent No.: US 6,684,372 B2
(45) Date of Patent: Jan. 27, 2004

(54) METHOD, SYSTEM AND COMPUTER PRODUCT TO TRANSLATE ELECTRONIC SCHEMATIC FILES BETWEEN COMPUTER AIDED DESIGN PLATFORMS

(75) Inventors: Sze Tom, Austin, TX (US); Harsh Sharma, Austin, TX (US); Kong-Fai Woo, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/098,914

(22) Filed: Mar. 15, 2002

(65) Prior Publication Data

US 2003/0177456 A1 Sep. 18, 2003

(51) Int. Cl.$^7$ .............................................. G06F 17/50
(52) U.S. Cl. ......................................................... 716/3
(58) Field of Search ................................ 716/2, 3, 6, 8, 716/10; 707/101, 200, 201; 703/14, 15

(56) References Cited

U.S. PATENT DOCUMENTS

| | | | |
|---|---|---|---|
| 4,649,513 A | | 3/1987 | Martin et al. |
| 5,452,227 A | * | 9/1995 | Kelsey et al. .................. 716/3 |
| 5,579,521 A | | 11/1996 | Shearer et al. |
| 5,765,169 A | | 6/1998 | Conner |
| 5,806,085 A | | 9/1998 | Berliner |
| 5,819,062 A | | 10/1998 | Srikantappa |
| 5,831,869 A | * | 11/1998 | Ellis et al. .................... 716/6 |
| 5,845,283 A | | 12/1998 | Williams et al. |
| 5,917,965 A | | 6/1999 | Cahill et al. |
| 5,948,057 A | | 9/1999 | Berger et al. |
| 5,983,240 A | | 11/1999 | Shoroff et al. |
| 5,995,980 A | | 11/1999 | Olson et al. |
| 6,014,629 A | | 1/2000 | DeBruin-Ashton |
| 6,081,811 A | | 6/2000 | Nilsson |
| 6,092,114 A | | 7/2000 | Shaffer et al. |
| 6,249,786 B1 | | 6/2001 | Wadewitz |
| 6,260,043 B1 | | 7/2001 | Puri et al. |
| 6,330,073 B1 | | 12/2001 | Sciatto |

FOREIGN PATENT DOCUMENTS

EP 0130375 9/1985

* cited by examiner

Primary Examiner—Vuthe Siek
Assistant Examiner—Naum B Levin
(74) Attorney, Agent, or Firm—Zagorin, O'Brien & Graham, LLP

(57) ABSTRACT

Provided is a method, a system and a computer product to translate electronic schematic files between computer-aided software design tools. One embodiment of the invention includes converting source files, containing electronic schematic information, into output files. Creating, from the source files, export files that omit a sub-portion of the schematic information, defining omitted data, each of the export files having a file name associated therewith. Appending, to the file name of the export files, data concerning the omitted information to form an appended file name. The export files are converted to the output files retained in the appended file name. The appended name is diminished so as to remove all information therefrom, excepting information corresponding to the omitted information.

20 Claims, 4 Drawing Sheets

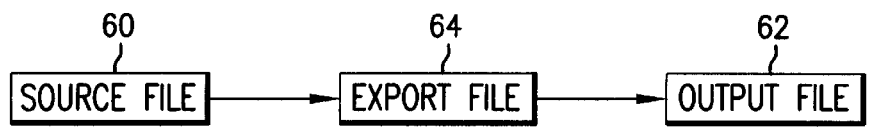
FIG. 3
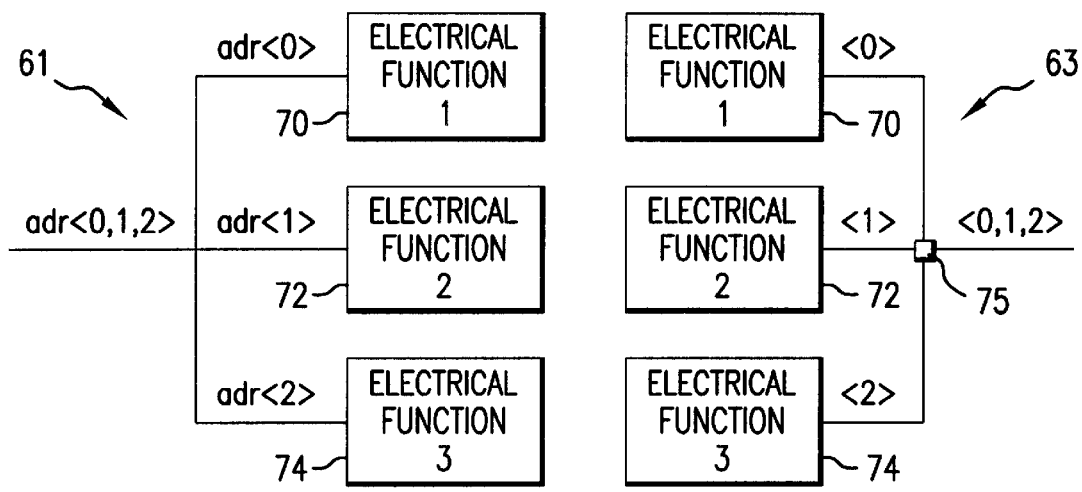
FIG. 4
abc — 76
$92 — 76        ← 175
01d — 76
4#c — 76
FIG. 5
        176a   176b
        ⌒      ⌒
        abc__adr — 176
        $92__adr — 176
        01d__adr — 176
  276 ↗ 4#c__adr — 176
FIG. 6
            376a  376c  376b
            ⌒    ⌒    ⌒
            abc__!!!__adr — 376
  376 →     $92__!!!__adr — 376
            01d__!!!__adr — 376
            4#c__!!!__adr — 376
FIG. 7

METHOD, SYSTEM AND COMPUTER PRODUCT TO TRANSLATE ELECTRONIC SCHEMATIC FILES BETWEEN COMPUTER AIDED DESIGN PLATFORMS

The present invention relates to integrated circuit development, and more specifically to translation of electronic schematic files between computer aided software design tools.

Computer-aided design of integrated circuits typically occurs in a multi-tool environment and may be generally divided into a front-end design phase and a back-end development phase, as shown in FIG. 1. During the front-end phase, the engineer user designs and develops, from a set of specifications, a logical representation of the integrated circuit of interest in the form of a schematic, at step 10. The schematic is then entered into a computing platform to generate a circuit netlist, at step 12. To that end, the computing platform includes computing hardware and one or more software tools, e.g., software applications. The netlist defines the entire integrated circuit, including all components and interconnections. Alternatively, the integrated circuit information may be developed using hardware description language (HDL) and synthesis. With the aid of integrated circuit test tools available to the computing platform, the user tests the design of the integrated circuit, at step 14. For example, the operation of the integrated circuit design may be emulated. The integrated circuit design test process may involve several iterations of design modifications and improvements until the integrated circuit design is finalized.

The back-end development involves several steps during which a final circuit layout (physical description) is developed based on the schematic. During placement step 16, various building blocks (or cells) as defined by the finalized integrated circuit schematic are placed within a predefined floor plan. For integrated circuit designs based on array or standard cell technology, the various circuit building blocks are typically predefined. As a result, each cell may correspond to one or more electrical functions, e.g., resistor, capacitor, differential operational amplifier, J-K flip-flop and the like. Placement is followed by a routing step 18, during which interconnects between cells are routed throughout the layout. Finally, the accuracy of the layout versus the schematic is verified at step 20. To that end, the design rules are verified by calling a file on the server that tests the different aspects of the integrated circuit design against different design criteria. For example, the electrical performance of the electrical functions corresponding to the cells employed may be tested. Were no errors or design rule violations found, at step 22, the circuit layout information would be used for the process of fabrication at step 24.

As standard in the computing industry, a wide variety of computing software tools to design integrated circuits exists. Often, the data generated by one software tool is not compatible for use with other software tools. For example, the Composer Tool format from Cadence Design Systems is not compatible with Mentor Graphics GDT format. As a result, considerable time and effort is required to translate, or convert, data between software tools.

To facilitate data conversions, software tools are designed to interpret data in one or more common formats that may be interpreted by all computing software tools, albeit not efficiently. An example of a common format is the electronic design interchange format (EDIF). In this manner, data exchange between first and second software tools occurs through the common format. For example, a first software tool converts data from a first domestic format, which is interpreted by the first software tool, to the common format. A second computing platform then interprets the common format data and converts the same to a second domestic format for interpretation by the second software tool.

Many utility applications exist that allow data conversions between two different software tools. However, many of these utility applications do not accurately convert the entire contents of data files. A need exists; therefore, to provide a method, and system and a computer product, to facilitate translation of electronic schematic files between computer-aided integrated circuit software design tools without losing information in the translation.

SUMMARY OF THE INVENTION

The present invention provides a method, a system and a computer product to translate electronic schematic files between computer-aided software design tools. One embodiment of the invention includes converting source files, containing electronic schematic information, into output files. Creating, from the source files, export files that omit a sub-portion of the schematic information, defining omitted data, with each of the export files having a file name associated therewith. Appending, to the file name of the export files, data concerning the omitted information to form an appended file name. The export files are converted to the output files and retain the appended file name. The appended name is diminished so as to remove all information therefrom, excepting information corresponding to the omitted information.

BRIEF DESCRIPTION OF THE DRAWINGS

FIG. 3 is a plan view of multiple files employed during translation, in accordance with one embodiment of the present invention;

FIG. 4 is a plan view showing an example of electronic schematic information and the corresponding export information that is created when translating the electronic schematic information, in accordance with an exemplary embodiment of the present invention;

FIG. 5 is a plan view of randomly generated rip_cell names that is associated with a rip_cell shown in FIG. 4;

FIG. 6 is a plan view of appended rip_cell names that include net_identification information, in accordance with one embodiment of the present invention;

FIG. 7 is a plan view of appended rip_cell names that include an export identifier and net_identification information, in accordance with an alternate embodiment of the present invention.

DETAILED DESCRIPTION OF THE PREFERRED EMBODIMENTS

Figure 1:
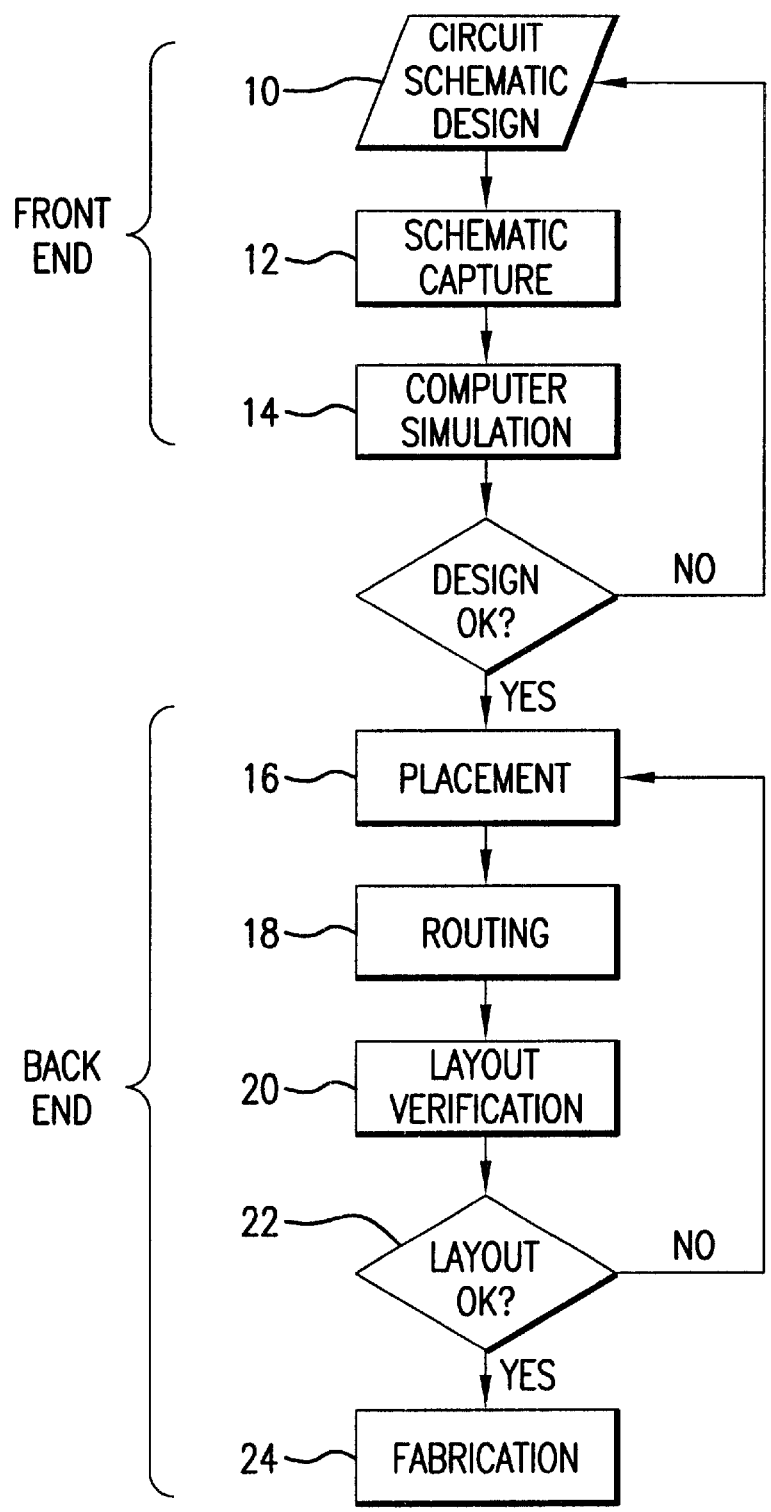
FIG. 1 is a flow diagram of a process for designing integrated circuits in accordance with the prior art.
Figure 2:
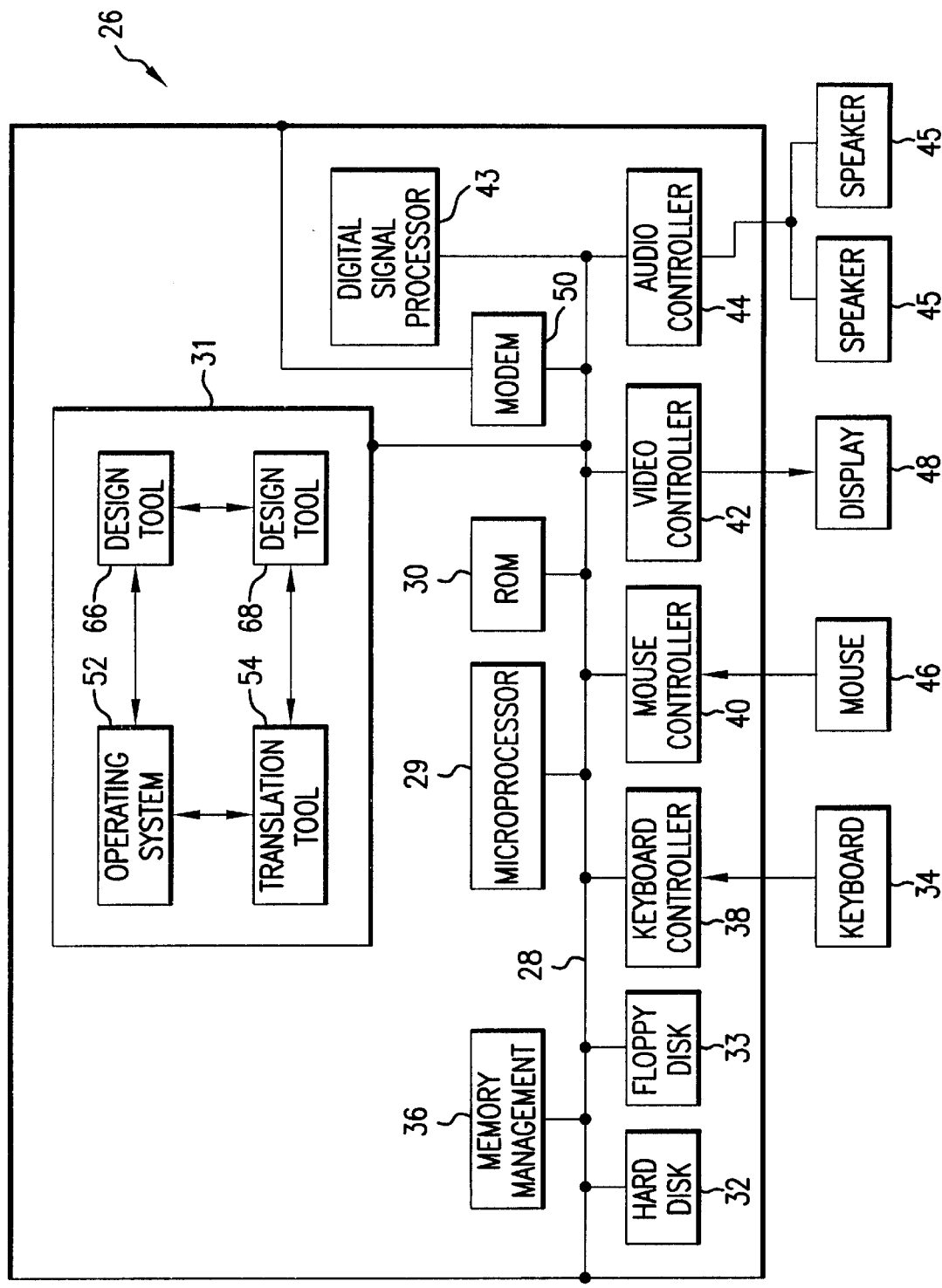
FIG. 2 is a block diagram of a computing platform in accordance with the present invention.
Figure 8:
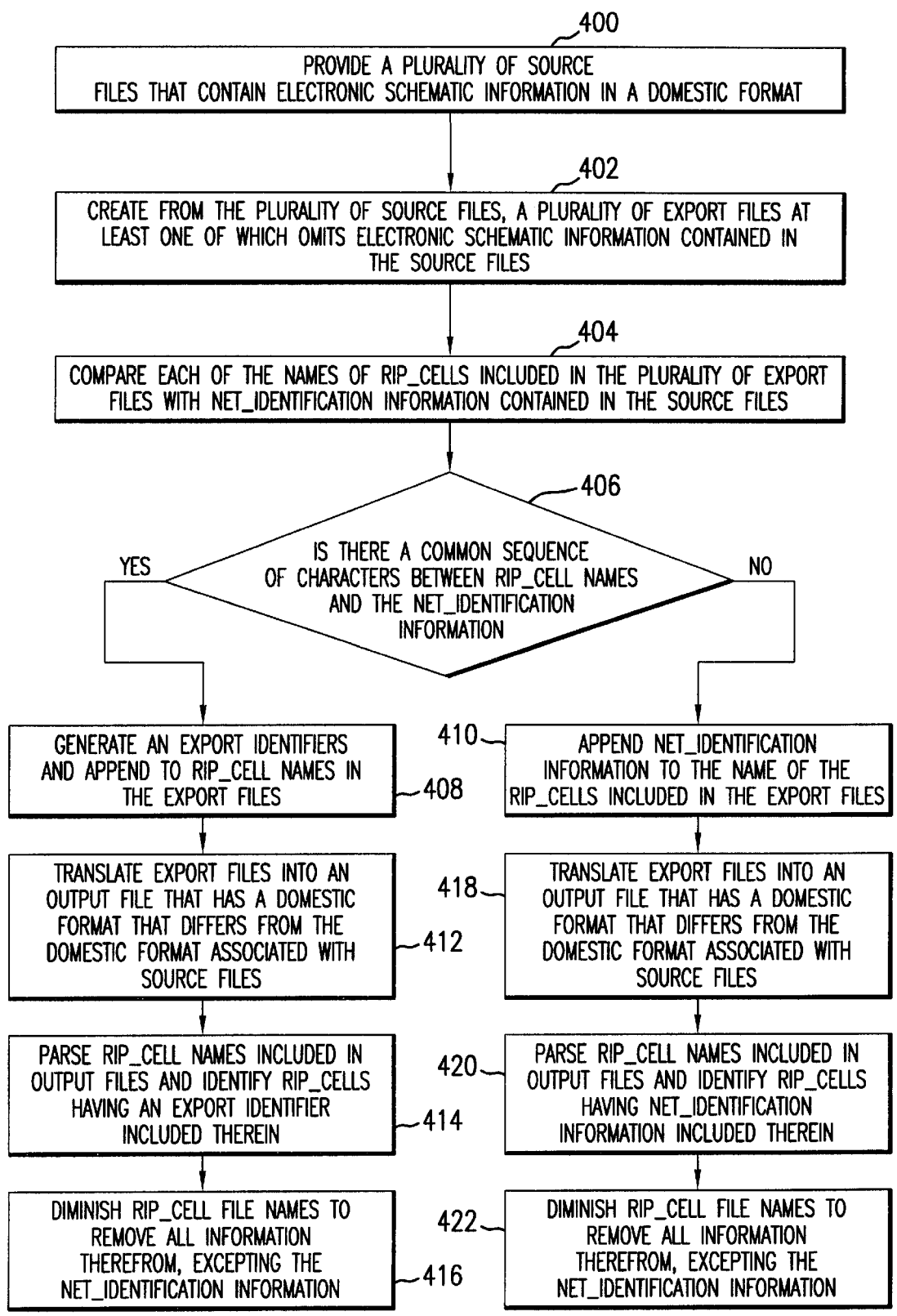
FIG. 8 is a flow diagram of a method for translating electronic schematic information in accordance with one embodiment of the present invention.

Referring to FIG. 2, a typical computing platform 26 in accordance with the present invention includes one or more system buses 28 placing various components thereof in data communication. For example, a microprocessor 29 is placed in data communication with both a read only memory (ROM) 30 and a random access memory (RAM) 31 via system bus 28. ROM 30 contains among other code, the Basic Input-Output system (BIOS) that controls basic hardware operation such as the interaction with peripheral components such as disk drives 32 and 33, as well as the keyboard 34.

RAM 31 is the main memory into which the operating system and application programs are loaded and affords at least 32 megabytes of memory space. A memory management chip 36 is in data communication with system bus 28 to control direct memory access (DMA) operations. DMA operations include passing data between the RAM 31 and the hard disk drive 32 and the floppy disk drive 33.

Also in data communication with system bus 28 are various I/O controllers: a keyboard controller 38, a mouse controller 40, a video controller 42, and an audio controller 44, which may be connected to one or more speakers 45. Keyboard controller 38 provides a hardware interface for keyboard 34, and mouse controller 40 provides a hardware interface for a mouse 46, or other point and click device. Video controller 42 provides a hardware interface for a display 48. A Network Interface Card (NIC) 50 enables data communication over the network facilitating data transmission speeds up to 1000 megabytes per second. The operating system 52 of computing platform 26 may be UNIX, LINUX, DOS, WINDOWS-based or any known operating system.

Referring to FIGS. 2, 3 and 4, a software tool translator 54 is loaded in RAM 31 to facilitate translation of source file 60 containing electronic schematic information 61 to an output file 62 via an intermediate export file 64. Source file 60 is in a first domestic file format that may be interpreted by a software design tool, 66, loaded in RAM 31. Export file 62 is in a second domestic file format that may be interpreted by a software design tool, 68, loaded in RAM 31. Software design tool 68 is not capable of interpreting source file 60, and software design tool 66 is not capable of interpreting output file 62. To that end, the translation between source file 60 and output file 62 occurs via export file 64. To that end, export file 64 is in a common format, such as EDIF, that may be interpreted by both design tools 66 and 68.

Referring to FIG. 4, electronic schematic information includes data concerning cells/electrical functions 70, 72 and 74, and wire interconnect information of the cells 70, 72 and 74 to each other and other components (not shown) of the integrated circuit. As shown, the interconnect information includes net_identification, shown as "adr", as well as the wire identification, e.g., <0,1,2>, <0>, <1>and <2>. Other information, not shown, is included in the interconnect information, such as any electrical signals contained on the interconnects, the duty cycle of the signals, the frequency and the like.

Referring to FIGS. 3 and 4, a problem solved by the present invention concerns the loss of electronic schematic information during the translation between source file 60 and export file 64. Specifically, translation from a mentor graphics "GDT" format to EDIF results in much of the remaining information contained in source file 60 being included in export information 63, such as data concerning cells 70, 72 and 74, as well as information concerning the wire identification e.g. <0,1,2>, <0>, <1> and <2>. Other data concerning the interconnect information resides in a rip_cell file 75. Rip_cell 75 appears at the junction of a plurality of interconnections.

Referring to FIGS. 2, 3, 4 and 5, as a result of the translation of electronic schematic information 61 for the entire integrated circuit design to export information 63, a set 175 of rip_cells is produced, each of which is associated with a name 76 randomly generated by the translation tool 54. However, net_identification information is omitted entirely from the export information 63 contained in export file 64. Without net_identification information the interconnect configuration of the cells 70, 72 and 74 would be difficult, if not impossible, to reconstruct once export file 64 had been translated to output file 62 in the Composer Tool format.

Referring to FIGS. 3, 4 and 6, to ensure that the net_identification associated with the interconnect information is translated to output file 62, rip_cell 75 is analyzed to determine the net_identification associated with the wires that are connected thereto. The net_identification is deduced by examining the properties of each of the interconnects for which rip_cell 75 contains information. Once the net_identification has been determined, the name of rip_cells 176 have information appended thereto, defining an appended name, to identify the net corresponding to the wire information contained by rip_cell 75. Appended name includes the randomly generated name portion 176a and the appended portion 176b, which in this case consists of the net_identification information. After creation of appended names 176, export information 63, which now includes a set 276 of rip cells 75 with appended names 176, is translated to output file 62. Thereafter, appended name 176 is diminished so that only the appended portion 176b remains in the name of rip_cell 75, e.g., the net_identification information.

Referring to FIGS. 4, 6 and 7, to associate each of the rip cells 75 with the appropriate net_identification, it is desired to ensure that appended portion 176b consists of a sequence of characters that are not present in the randomly generated portion 176a. To that end, another embodiment of appended name 376 may include additional identifier information, referred to herein as export identifier 376c. Export identifier 376c is included in appended name 376, in addition to the randomly generated name 376a and net_identification information 376b. Export identifier 376c identifies appended name as having net_identification information appended thereto, and is selected so that the sequence character set does not coincide with the sequence of any character set present in the randomly generated name 376a. In addition, the number of characters employed to create export identifier 376c is minimized to reduce the computational requirements for translation.

Specifically, once appended name 376 has been generated for rip-cells 75, translation from EDIF to composer is undertaken. The appended names 376 are then parsed. Appended names 376 are identified and the randomly generated portion 376a and export identifier 376c are removed, leaving the net_identification information.

Referring to FIGS. 3, 4, 6, 7 and 8, in operation at step 400 provided is a plurality of source files that contain electronic schematic information 61 in a domestic format, for example, GDT. At step 402, a plurality of export files 64, each containing export information 63, is created from source files 60 by translation of electronic schematic information 61 to a common format, for example EDIF. The translation results in the omission of certain information from one or more of the export files 64. In this example, the omitted information is net_identification information associated with interconnect information contained in rip_cell 75. At step 404, each of the names of rip_cells 75 of each export file 64 is compared to the net_identification information present among the various export files. At step 406, it is determined whether there exists a common sequence of characters among one of the rip_cell names and the net_identification information. Were this the case, then the process would commence at step 408. Otherwise, the process would proceed to step 410. At step 408, export identifiers 376c are generated and appended to the names of rip_cells 75 included in export files 64. The export identifier 376c consists of a sequence of characters that would not be present in any of the randomly generated names of rip_cells 75. Thereafter, as step 412, the plurality of export files 64 is translated to another domestic format, for example composer format, forming a plurality of output files 62. At step 414, the rip_cell names in the output files 62 are parsed and the rip_cell names having export identifiers are identified. The file name of at least some, if not all of rip_cells 75 associated with export identifiers have the file name diminished to remove all information, excepting the net_identification information 376b, at step 416.

At step 410, net_identification information 376b would be generated and appended to the names of the rip_cells 75. Specifically, net_identification 376b is appended to the name of the rip_cells 75 associated with the export files 64. Thereafter, at step 418, the plurality of export files 64 are translated to another domestic format, for example composer format, forming a plurality of output files 62. At step 420, the output files 62 are parsed and the names of rip_cells 75 are parsed and the file names of the rip_cells including net_identification information 376b are identified. The file name of the rip_cells 75 associated with these export files 62 are diminished to remove all information, excepting the net_identification information 376b, at step 422.

Although the foregoing has been discussed with respect to integrated circuit design testing, it should be understood that the present invention may be employed in any type of computer file translations. Further, export identifiers may include information other than the presence of net_identification information that is appended to a rip_cell name. For example, the export identifiers may indicate that net_identification information is appended to a name of a rip_cell 75, but that the rip_cell is not to be renamed to include the net_identification information once translated into output file 62. Thus, the embodiments of the present invention described above are exemplary and the scope of the invention should, therefore, be determined not with reference to the above description, but instead should be determined with reference to the appended claims along with their full scope of equivalents.

What is claimed is:

1. A method of converting a source file, containing electronic schematic information, into an output file, said method comprising:
   creating, from said source file, an export file that includes a rip_cell file and omits a sub-portion of said schematic information, defining omitted data, with said rip_cell file having a file name associated with said rip_cell file;
   appending, to said file name, data concerning said omitted information to form an appended file name;
   converting said export file to said output file that includes said rip_cell file having said appended file name; and
   diminishing said appended file name to remove all information therefrom, excepting information corresponding to said omitted information.

2. The method as recited in claim 1 wherein creating further includes creating said export file to include said rip_cell file having a first character set and appending further includes appending data to said file name having a second character set associated therewith that differs from said first character set.

3. The method as recited in claim 1 wherein said data includes an export identifier to indicate that net_identification information is appended to said file name.

4. The method as recited in claim 1 wherein said source file is in mentor graphics tool format, said export file is in electronic design interchange format and said output file is in cadence composer format.

5. The method as recited in claim 1 wherein said electronic schematic information includes electrical functions, interconnect information concerning wire connections between said electrical functions, data present on said wire connections and a net_identification of said wire connections, with said omitted information consisting essentially of said net_identification.

6. The method as recited in claim 1 further including providing a plurality of source files, each of which includes said electronic schematic information, wherein creating an export file further includes, creating, from said plurality of source files, a plurality of exports files, a subset of which includes said rip_cell file, and omits said sub-portion of said schematic information.

7. The method as recited in claim 1 further including providing a plurality of source files, each of which includes said electronic schematic information, wherein creating an export file further includes, creating, from said plurality of source files, a plurality of export files, a first and second subset of which includes said rip_cell file, and omits said sub-portion of said schematic information, and appending further including appending to the file name of the rip cell corresponding to export file associated with said first subset, first data concerning said omitted information, defining a first appended file name, and appending to the file name of the rip_cell file corresponding to export file associated with said second subset, second data concerning said omitted information, defining a second appended file name, with diminishing said appended name further including diminishing said first appended name to remove all information therefrom, excepting information corresponding to said omitted information, while maintaining said second appended name.

8. A system for converting a source file, containing electronic schematic information, into an output file, said computer system comprising:
   means for creating, from said source file, an export file that includes a rip_cell file and omits a sub-portion of said schematic information, defining omitted data, with said rip_cell file having a file name associated with said rip_cell file;
   means for appending, to said file name, data concerning said omitted information to form an appended file name;
   means for converting said export file to said output file that includes said rip_cell file having said appended file name; and
   means for diminishing said appended file name to remove all information therefrom, excepting information corresponding to said omitted information.

9. The system as recited in claim 8 wherein said means for creating further includes means for creating said export file to include said rip_cell file having a first character set and said means for appending further includes means for appending data to said file name having a second character set associated therewith that differs from said first character set.

10. The system as recited in claim 8 wherein said data includes an export identifier to indicate that net_identification information is appended to said file name.

11. The system as recited in claim 8 wherein said source file is in mentor graphics tool format, said export file in is electronic design interchange format and said output file is in cadence composer format.

12. The system as recited in claim 8 wherein said electronic schematic information includes electrical functions, wire connections between said electrical functions, data present on said wire connections and a net identification of said wire connections, with said omitted information consisting essentially of said net identification.

13. The system as recited in claim 8 further including means for providing a plurality of source files, each of which includes said electronic schematic information, wherein said means for creating further includes, means for creating, from said plurality of source files, a plurality of exports files, a subset of which includes said rip__cell file, and omits said sub-portion of said schematic information.

14. The method as recited in claim 8 further including means for providing a plurality of source files, each of which includes said electronic schematic information, wherein said means for creating an export file further includes, means for creating, from said plurality of source files, a plurality of export files, a first and a second subset of which includes said rip__cell file, and omits said sub-portion of said schematic information, with said means for appending further including means for appending to the file name of the rip__cell corresponding to export files associated with said first subset, first data concerning said omitted information, defining a first appended file name, and means for appending to the file name of the rip__cell file corresponding to export files associated with said second subset, second data concerning said omitted information, defining a second appended file name, with said means for diminishing said appended name further including means for diminishing said first appended name to remove all information therefrom, excepting information corresponding to said omitted information, while maintaining said second appended name.

15. A computer program product for converting a source file, containing electronic schematic information, into an output file, said computer program product comprising:

code to create, from said source file, an export file that includes a rip__cell file and omits a sub-portion of said schematic information, defining omitted data, with said rip__cell file having a file name associated with said rip__cell file;

code to append, to said file name, data concerning said omitted information to form an appended file name;

code to convert said export file to said output file that includes said rip__cell file having said appended file name; and code to diminish said appended file name to remove all information therefrom, excepting information corresponding to said omitted information.

16. The computer program product as recited in claim 15 wherein said source file is in mentor graphics tool format, said export file in is electronic design interchange format and said output file is in cadence composer format.

17. The computer program product as recited in claim 15 wherein said data includes an export identifier to indicate that net__identification information is appended to said file name.

18. The computer program product as recited in claim 15 wherein said electronic schematic information includes electrical functions, wire connections between said electrical functions, data present on said wire connections and a net identification of said wire connections, with said omitted information consisting essentially of said net identification.

19. The computer program product as recited in claim 15 further including code to provide a plurality of source files, each of which includes said electronic schematic information, wherein said code to create further includes a subroutine to create, from said plurality of source files, a plurality of exports files, a subset of which includes said rip__cell file, and omits said sub-portion of said schematic information.

20. The computer program product as recited in claim 15 further including code to provide a plurality of source files, each of which includes said electronic schematic information, wherein said code to create, further includes code to create, from said plurality of source files, a plurality of export files, a first and a second subset of which includes said rip__cell file, and omits said sub-portion of said schematic information, with said code to append further including a first subroutine to append to the file name of the rip__cell corresponding to export files associated with said first subset, first data concerning said omitted information, defining a first appended file name, and a second subroutine to append to the file name of the rip__cell file corresponding to export files associated with said second subset, second data concerning said omitted information, defining a second appended file name, with said code to diminish said appended name further including code to diminish said first appended name to remove all information therefrom, excepting information corresponding to said omitted information, while maintaining said second appended name.

* * * * *

UNITED STATES PATENT AND TRADEMARK OFFICE
CERTIFICATE OF CORRECTION

PATENT NO. : 6,684,372 B1
DATED : January 27, 2004
INVENTOR(S) : Sze Tom et al.

It is certified that error appears in the above-identified patent and that said Letters Patent is hereby corrected as shown below:

Column 6,
Lines 31-34, "corresponding to export file associated with said first subset, first data concerning said omitted information, defining a first appended file name, and appending to the file name of the rip_cell file corresponding to export file associated with" should read -- corresponding to export files associated with said first subset, first data concerning said omitted information, defining a first appended file name, and appending to the file name of the rip_cell file corresponding to export files associated with --

Signed and Sealed this

Eighteenth Day of May, 2004

JON W. DUDAS
*Acting Director of the United States Patent and Trademark Office*